Patented June 5, 1951

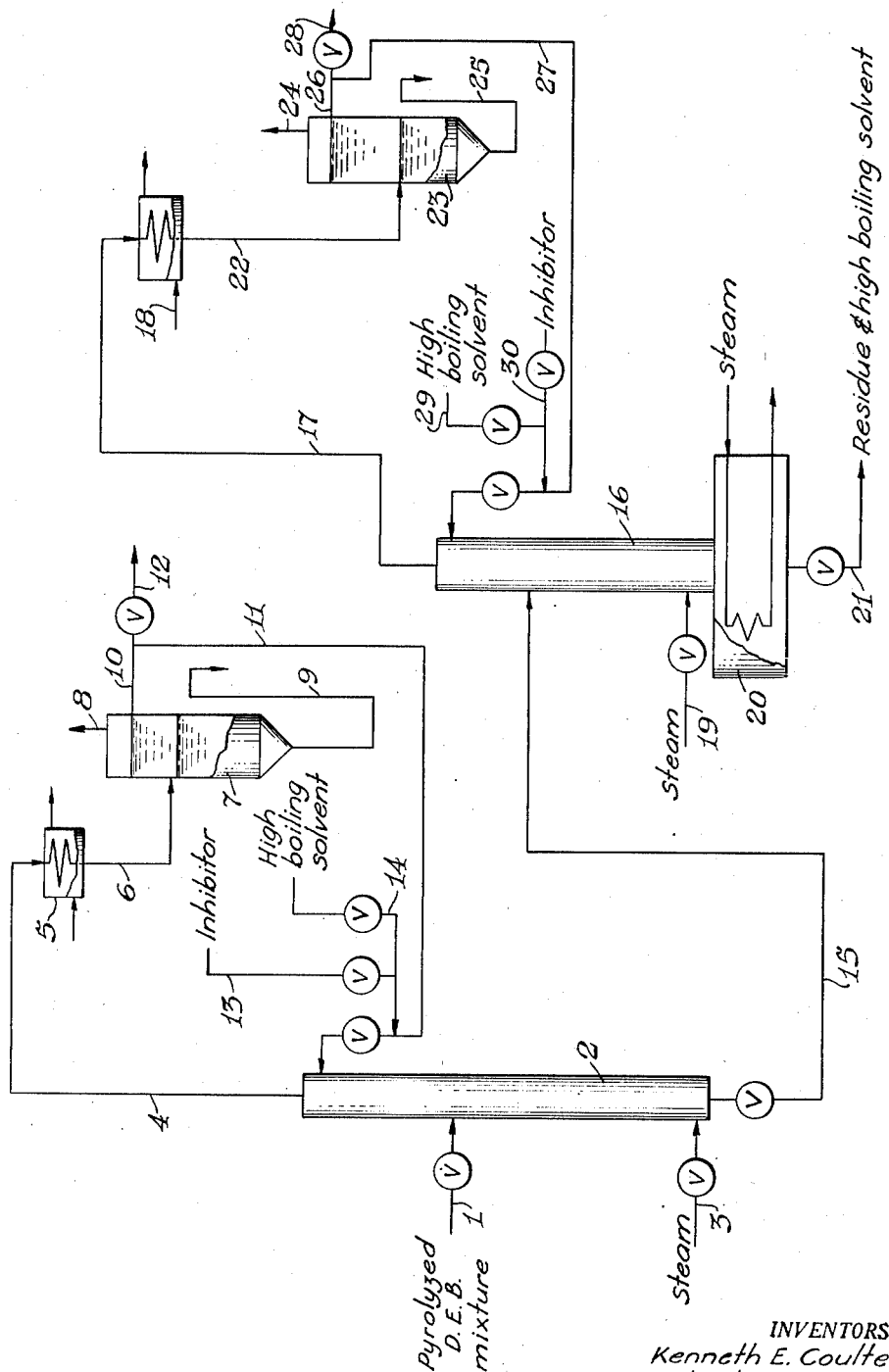

2,556,030

UNITED STATES PATENT OFFICE 2,556,030

PROCESS FOR DISTILLING VINYL AROMATIC COMPOUNDS

Kenneth E. Coulter, Bay County, and Herbert G. Hornbacher, Midland, Mich., assignors to The Dow Chemical Company, Midland, Mich., a corporation of Delaware Application February 21, 1949, Serial No. 77,664

5 Claims. (Cl. 202—57)

This invention concerns an improved method of purifying vinyl aromatic compounds which are highly susceptible to polymerization. It relates more particularly to a process for concentrating and recovering ethylvinylbenzene and divinylbenzene present in mixtures formed by the pyrolysis of diethylbenzene or higher dialkylbenzenes.

It is known that vinyl aromatic compounds may be formed by the pyrolysis of alkylated aromatic compounds such as ethylbenzene, diethylbenzene, diisopropylbenzene, or diethyltoluene, etc. The ease with which the vinyl aromatic products are polymerized when heated and the fact that the pyrolysis mixtures usually contain, together with the vinyl aromatic products, other compounds of close to the same boiling point, renders difficult the separation and recovery of the vinyl aromatic compounds by fractional distillation. Dreisbach, in United States Patent 2,445,941, has shown that vinyl aromatic compounds, more specifically ethylvinylbenzene and divinylbenzene, can be separated from pyrolysis products containing the same by subjecting the pyrolysis product to a series of distillation operations at subatmospheric pressure. The process disclosed in the patent consists of subjecting a pyrolysis mixture to a series of distilling operations wherein the mixture is fractionally distilled at subatmospheric pressure in the absence of water vapor, but in the presence of a polymerization inhibitor to distill and remove lower boiling ingredients from the pyrolysis mixture and concentrate the vinyl aromatic compounds in a residue, which residue is thereafter flash distilled under vacuum in the presence of a polymerization inhibitor and an equal weight or more of water vapor to recover the vinyl aromatic compounds in purified form. The patent further teaches that the distillation at subatmospheric pressure in the absence of water vapor should be terminated prior to expiration of the induction period of the vinyl aromatic compounds to avoid the occurrence of appreciable amounts of polymerization. The induction period of the vinyl aromatic compounds may be renewed by a flash distillation under vacuum with water vapor and may be extended for a period of about 8 hours at temperatures of 70°–100° C., by treatment of the freshly distilled vinyl aromatic compound with a polymerization inhibitor.

Many vinyl aromatic compounds such as para-chloro-styrene, para-bromo-styrene, ethylvinylbenzene, divinylbenzene, etc., polymerize more readily and rapidly than styrene at a given temperature so that during distillation of a pyrolysis mixture containing the same to concentrate the vinyl aromatic product some polymerization of the latter usually occurs. Such polymerization is, in general, greatest when the fractional distillation at subatmospheric pressure without water vapor is not terminated prior to expiration of the induction period of the vinyl aromatic compound or the distilling temperature is sufficiently high to cause rapid polymerization. Since the induction period of a vinyl aromatic compound is a variable quantity, depending in part upon the temperature and concentration for a particular compound, it is difficult to determine the induction time of the vinyl aromatic compounds under the operating conditions so as to terminate the distillation prior to expiration of the same and avoid the occurrence of polymerization. The polymeric vinyl aromatic compounds, e. g. the polymers and copolymers of divinylbenzene, are frequently insoluble or only slightly soluble in the monomeric vinyl aromatic compounds so that the occurrence of even small amounts of polymerization may form gels in the still and column or a solid residue which is likely to result in plugging of the still or the distilling column. In particular, during the final distillation to recover the vinyl aromatic compound in purified form, the residue frequently gels and forms an insoluble and infusible mass when the vinyl aromatic compound is separated therefrom and polymer is concentrated in the residue, so that the waste residue cannot be made to flow from the column. For these reasons, adequate control of the process of the aforementioned United States Patent 2,445,941 is difficult when purifying large quantities of vinyl aromatic compounds which are higher boiling and more readily polymerizable than styrene.

We have discovered that vinyl aromatic compounds more readily polymerizable than styrene, regardless of the concentration, can be distilled at atmospheric pressure without appreciable occurrence of polymerization by carrying out the distillation with water vapor, i. e. steam, in amount of 2.5 parts by weight or more per part of the vinyl aromatic compound used and in the presence of a polymerization inhibitor and an organic solvent having a higher boiling point than the vinyl aromatic compounds. We have further found that vinyl aromatic compounds present in mixtures formed by pyrolysis of alkylated aromatic compounds such as diethylbenzene, triethylbenzene, diethyltoluene, etc., can readily be fractionally distilled so as to separate substantially completely the unreacted polyalkyl aromatic compounds and lower boiling pyrolysis products from the vinyl aromatic compounds and concentrate the latter compounds in a residue composed largely of vinyl aromatic compounds and a high boiling organic solvent while at the same time polymerization of the vinyl aromatic compounds is greatly reduced or entirely prevented. The residue containing the vinyl aromatic compounds in concentrated form is then subjected to a similar distilling operation at atmospheric pressure by admixture with steam in the presence of a polymerization inhibitor and an inert organic solvent having a higher boiling point than the vinyl aromatic compound to recover the vinyl aromatic compound in purified form and leave a fluid residue that can readily be withdrawn from the distilling zone.

During such distillation of the vinyl aromatic compound at atmospheric pressure together with steam in the presence of a highly effective polymerization inhibitor and an organic solvent boiling higher than the vinyl aromatic compound, the water vapor has an effect of lowering the distillation temperature below that required at the same pressure in the absence of the water vapor. Because of such lowering of the distilling temperature the tendency toward polymerization of the vinyl aromatic compound is reduced.

The high boiling organic solvent serves as a diluent and fluidizing agent, or solvent, to maintain the residue in a liquid state and thus facilitates removal of the residue from the distilling column. The organic solvent further appears to have an inhibiting effect on the polymerization of the vinyl aromatic compounds, apparently because of the effect of dilution and by maintaining the residue and any minor amounts of polymer in solution so as to avoid the occurrence of gels in which polymerization of the monomers may proceed at a greatly accelerated rate. Regardless of whether the action of the steam and the high boiling organic solvent in reducing the tendency toward polymerization of the vinyl aromatic compounds is due to dilution of the same or to the water vapor and the organic solvent serving as polymerization inhibitors, the combination of both, while reducing the tendency toward polymerization, is not sufficiently effective to preclude the occurrence of polymerization to a considerable extent during distillation at atmospheric pressure of the vinyl aromatic compounds with which the invention is concerned. However, by the conjoint use of water vapor, a high boiling organic solvent and a small amount of a highly effective polymerization inhibitor, a synergistic effect is obtained such that the distillation may readily be carried out at atmospheric pressure, or slightly above, e. g. at from 1 to 5 pounds per square inch gauge pressure, without appreciable polymerization of the vinyl aromatic compounds. The waste residue remains in liquid form and is readily removed from the distilling column. By carrying out the distilling operations at atmospheric pressure, the process can readily be controlled, the distilling temperatures are maintained more uniform throughout the column and the disadvantages of carrying out a distillation under vacuum are avoided, e. g. the maintenance of a high vacuum.

The process may be carried out by feeding the vinyl aromatic compound into the mid-section of a distilling column while concurrently feeding into said section, or into an upper section of the column, an inert organic solvent having a higher boiling point than the vinyl aromatic compound and a minor proportion of a polymerization inhibitor, feeding into a lower section of the column an amount of steam sufficient to distill together water vapor and vinyl aromatic compound, and withdrawing liquid residue from the bottom of the distilling column. The process is preferably carried out in continuous manner.

The high boiling organic solvent to be used in the process should be chemically inert to the vinyl aromatic compounds at the temperatures employed in carrying out the distilling operations. It should be less volatile with steam than the vinyl aromatic compounds and should have a boiling point at atmospheric pressure sufficiently higher than the boiling point of the vinyl aromatic compounds to permit easy separation in a fractionating column.

An inert organic material which is liquid at 100° C. or lower and having a boiling point of 10° C. or more above the boiling point of the vinyl aromatic compound to be purified may be used in the process. The high boiling organic liquid should be miscible with the vinyl aromatic compounds and should be capable of dissolving or fluidizing the waste residue and any minor amount of polymer that may be formed in carrying out the distilling operations so as to wash the latter materials from the distilling column and form a readily flowable mixture which can easily be withdrawn from the distillation zone. In general, the high boiling organic compounds that are liquids at ordinary temperatures, which compounds are good solvents for polystyrene and have a higher boiling point than the vinyl aromatic compound are satisfactory. The inert high boiling organic solvent is preferably a polyalkylated aromatic compound having not more than 10 carbon atoms in the aromatic nucleus, which compound may contain in addition to the alkyl radicals from 1 to 4 halogen atoms attached to carbon atoms of the aromatic nucleus. Examples of inert high boiling organic compounds that are suitable for use in the process are triethylbenzene, tetraethylbenzene, triisopropylbenzene, tetraisopropylbenzene, triisopropyltoluene, diethyldiisopropylbenzene, diethyl-chlorobenzene, diethyl - dichlorobenzene, triethyl - chlorobenzene, ethyl - dibromobenzene, diethyl - bromobenzene, isopropyl-bromobenzene, ethyl-dichlorobenzene, diamylnaphthalene and 1-chloronaphthalene. Mixtures of such compounds may also be employed in the process.

The high boiling organic solvent is employed in an amount sufficient to maintain the residue in a fluid state by solubilizing any minor amount of polymer that may be formed in carrying out the distilling operations. The organic solvent may be used in amount corresponding to from 5 to 100 per cent by weight or more of the vinyl aromatic compound. However, since the organic solvent is withdrawn in admixture with the waste residue, it is more economical to use an amount of the organic solvent in each of the distilling operations corresponding to 50 per cent by weight or less of the vinyl aromatic compound. The organic solvent is preferably employed in amount corresponding to from 5 to 25 per cent by weight of the vinyl aromatic compounds in the mixture being distilled.

The organic solvent must in all instances have a higher boiling point than the boiling point of the vinyl aromatic compound to be purified. How great this differential in boiling point need be for successful operation of the process is dependent in part upon the degree of fractionation obtained in the distilling column. In general, when a degree of fractionation such as to cause substantially complete separation of diethylbenzene from ethylvinylbenzene is obtained in carrying out the distilling operation, an inert organic solvent having a boiling point only slightly higher, e. g. from 10° to 20° C. higher, than the boiling point of the vinyl aromatic compound may be used, whereas if the distillation operation amounts in effect to a simple flash distillation such as may be employed in distilling a mixture containing largely vinyl aromatic compounds and higher boiling ingredients not readily vaporizable with steam, an organic solvent boiling at a temperature of from 80° to 100° C. or more above the boiling point of the vinyl aromatic compounds is preferably employed.

The high boiling organic solvent is usually fed into the mid-section or upper two-thirds of the column so as to distribute the same uniformly throughout a part of the column. The organic solvent may be mixed with the crude pyrolysis mixture employed as feed to the distilling column, or fed into admixture with the reflux stream of the distillate and so passed into the column or it may be fed into the column as a separate stream while at the same time a highly effective polymerization inhibitor is fed into the upper section of the distilling column in order that the inhibitor may be distributed within the distilling column throughout a major part of its length. The point of feed of the high boiling solvent may be somewhat, e. g. one or two feet, below the inlet for feeding the material to be distilled to the distillation column, but it is preferably at or above the level of said inlet.

A number of polymerization inhibitors which may be used in the process are known. Examples of such inhibitors are 2,4-dichloro-6-nitrophenol, 2,4-dichloro-6-nitrocresol, 2-nitro-4-chlorophenol, 2,6-dinitro-4-chlorophenol, 2,4-dibromo-4-nitrophenol, nitrophenol, dinitrocresol, etc. Usually one per cent by weight or less of such inhibitors, based on the vinyl aromatic compounds in the distilling mixture, is sufficiently effective to prevent polymerization, although the inhibitors may be used in as large a proportion as desired. The polymerization inhibitor is preferably dissolved in a portion of the organic layer of the distillate and fed into admixture with the reflux liquid being returned to the column.

The accompanying drawing is a diagrammatic sketch showing an arrangement of apparatus suitable for use in distilling and recovering a mixture of ethylvinylbenzene and divinylbenzene from a pyrolyzed diethylbenzene mixture.

In the drawing, the numeral 1 designates a valved inlet to a distilling colum 2 which is provided toward its lower end with a valved inlet 3. A vapor line 4 leads from the top of the column 2 and connects with a condenser 5. A line 6 leads from the condenser and connects with a continuous separator 7. The separator is provided with a vent line 8 located on the top, an outlet 9 on the bottom and another outlet 10 toward the top which connects with a valve reflux-return line 11 and a valved line 12 for withdrawing distillate. Valved lines 13 and 14 leading into line 11 serve as inlets for the introduction of a polymerization inhibitor and a high boiling organic solvent, respectively, into the column. A valved line 15 from the bottom of column 2 connects with another distilling column 16, near the mid-section of the latter. Column 16 is provided at its upper end with a vapor line 17 and a condenser 18. Toward its lower end, the column is provided with an inlet 19 and is connected to a reboiler 20 or other heater. The reboiler may be heated with a steam coil as shown or by other manner. The reboiler is provided with a valved outlet 21 for withdrawing residue. A line 22 leads from the condenser 18 and connects with a continuous separator 23. The separator is provided on its top with a vent line 24, an outlet 25 on the bottom and an overflow line 26 which connects with valved reflux-return line 27 and a valved line 28 for withdrawing distillate. Valved lines 29 and 30 branching from reflux-return line 27 serve as inlets for feeding a high boiling organic solvent and a polymerization inhibitor into the distilling column. It will be understood that the arrangement of apparatus shown in the drawing is illustrative, and that it may be changed or modified without departing from the invention.

In employing the apparatus shown in the drawing for the recovery of a mixture of ethylvinylbenzene and divinylbenzene from a complex mixture obtained by the pyrolysis of diethylbenzene, the crude pyrolysis mixture, preferably containing a polymerization inhibitor, is introduced in steady flow through inlet 1 into the distilling column 2 where it is heated to a distilling temperature by admixture with steam, introduced into the column through inlet 3. Sufficient steam is introduced into the column to distill and remove together with water vapor the unreacted diethylbenzene and lower boiling ingredients from the pyrolysis mixture. Concurrently with introduction of the crude pyrolysis mixture into the column 2, a polymerization inhibitor and an organic solvent, e. g. triisopropylbenzene, having a higher boiling point than divinylbenzene is introduced in continuous flow through inlets 13 and 14, respectively, into the reflux-return line in order that the materials may be distributed within the distilling column throughout a major part of its length. The distillation is carried out at atmospheric pressure or thereabout, e. g. at from 1 to 5 pounds per square inch gauge pressure, in such manner as to distill the unreacted diethylbenzene and lower-boiling ingredients from the pyrolysis mixture together with water vapor and form a residue containing ethylvinylbenzene and divinylbenzene as the vinyl aromatic compounds. The residue withdrawn from the bottom of column 2 which consists largely of ethylvinylbenzene, divinylbenzene, and high boiling organic solvent, is passed through line 15 to another distilling column 16 to distill at atmospheric pressure the ethylvinylbenzene and divinylbenzene as a mixture together with water vapor from the high boiling organic solvent and waste residue, by admixture with steam in the presence of a polymerization inhibitor and an additional amount of a high boiling organic solvent not readily vaporizable at the distilling temperature, as in the first distillation. In carrying out this distillation, the column 2 is preferably connected to a reboiler 20 or other heater equipped with a steam coil as shown in the drawing, so as to heat the waste residue to a temperature sufficient to vaporize a portion of the water condensed in the distilling column and reduce the volume of waste residue withdrawn through line 21, although such reboiler or heater is not necessary in the process. The distillate flows to a continuous separator 23 wherein the aqueous and organic layers thereof are separated. The aqueous layer is withdrawn through outlet 25 and the organic layer through overflow line 26 and valved line 28. A part of the organic layer is returned via line 27 to the column as reflux. The organic layer consists of a mixture of ethylvinylbenzene and divinylbenzene.

Instead of distilling a pyrolysis mixture with steam at atmospheric pressure in the presence of a polymerization inhibitor and a high boiling organic solvent in a series of concurrent distillation operations as just described to obtain a mixture of ethylvinylbenzene and divinylbenzene, the crude pyrolysis mixture may be fractionally distilled as described in the first of the distilling operations, to remove the unreacted diethylbenzene and lower boiling ingredients from the pyrolysis mixture and obtain a residue containing only divinylbenzene and ethylvinylbenzene as the vinyl aromatic compounds. This residue may then be employed as the feed to column 2 and fractionally distilled with steam in the presence of a polymerization inhibitor and an inert high boiling organic solvent to obtain ethylvinylbenzene as distillate and leave a residue composed largely of divinylbenzene and inert high boiling organic solvent, which residue is fed into column 16 and distilled at atmospheric pressure in the presence of a polymerization inhibitor and an inert high boiling organic liquid by admixture with steam to obtain divinylbenzene in purified form.

The distillations involved in the process are preferably carried out in continuous manner, as hereinbefore described, but they may be carried out batchwise, if desired.

Although the invention has been described with special reference to the problem of recovering ethylvinylbenzene and divinylbenzene from a pyrolyzed diethylbenzene mixture, other vinyl aromatic compounds more readily polymerizable and higher boiling than styrene may similarly be recovered from pyrolysis mixtures containing the same. The method may advantageously be applied in recovering para-chlorostyrene from a pyrolyzed para-chloro-ethylbenzene mixture; in recovering vinyl-dichlorostyrene from a pyrolyzed ethyl-dichlorobenzene mixture; and in recovering methyl-divinylbenzene from a mixture obtained by pyrolysis of diethyltoluene; etc.

The following examples describe ways in which the principle of the invention has been applied but are not to be construed as limiting its scope.

*Example 1*

A mixture containing approximately 57 per cent by weight ethylvinylbenzene and 38 per cent divinylbenzene, which mixture had been obtained by pyrolyzing diethylbenzene and vacuum distilling from the pyrolyzed mixture unreacted diethylbenzene and low-boiling ingredients, was distilled at atmospheric pressure by admixture with steam while introducing into the distilling column a liquid mixture of polyisopropyl benzenes having a boiling range of 300° C. and above. The mixture of ethylvinylbenzene and divinylbenzene subjected to the distillation contained 0.1 per cent by weight of 2,4-dichloro-6-nitrophenol as a polymerization inhibitor. The mixture was fed at an average rate of 100 pounds per hour into the mid-section of a column 12 inches in diameter by 16 feet long having a core composed of semi-circular discs spaced 6 inches apart on a central support, each semi-circular disc being disposed around the central support one-quarter of a revolution so as to form a series of baffles. A total of 2400 pounds of the ethylvinylbenzene-divinylbenzene mixture was fed into column. The liquid polyisopropylbenzenes were fed into the column at a point just below the point of feed of the ethylvinylbenzene-divinyl benzene mixture in amount of 15 pounds per hour throughout the distillation. Steam under a pressure of 150 pounds per square inch gauge was throttled through a valve and fed into the bottom of the column at a rate sufficient to distill together water vapor, ethylvinylbenzene and divinylbenzene. The distillate separated into a lower aqueous layer and an upper hydrocarbon layer. A portion of the organic layer of the distillate corresponding to 55 pounds per hour was returned to the column as reflux. There was recovered from the distillate 2181 pounds of a colorless hydrocarbon layer, which layer analyzed 60 per cent by weight ethylvinylbenzene and 40 per cent divinylbenzene. The yield was 90.9 per cent, based on the crude mixture fed to the column.

*Example 2*

This example illustrates the concentration of ethylvinylbenzene and divinylbenzene by distillation of a complex mixture obtained by pyrolysis of diethylbenzene. The crude pyrolysis mixture contained 38 per cent by weight ethylvinylbenzene and 19 per cent divinylbenzene, the remainder being composed principally of unreacted diethylbenzene with minor amounts of benzene, toluene, ethyltoluene, ethylbenzene, methylstyrene, and styrene. The pyrolysis mixture contained approximately 0.5 per cent by weight of 2,4-dichloro-6-nitrophenol as polymerization inhibitor. The mixture was fed at a rate of 26 pounds per hour into the mid-section of a 12 inch diameter by 30 plate bubble cap distilling column which was operated in continuous manner to distill together water vapor unreacted diethylbenzene, lower-boiling ingredients and sufficient of the ethylvinylbenzene to leave a residue of undistilled material containing approximately 60 parts by weight ethylvinylbenzene and 40 parts divinylbenzene. During operation, steam was fed into the bottom of the column at a rate of 325 pounds per hour while 0.24 pound of the polymerization inhibitor, 2,4-dichloro-6-nitrophenol, and 2.5 pounds of a mixture of polyisopropyl benzenes having a boiling range of 300° C. and above, was dissolved per hour in the organic portion of the distilled liquor being returned to the column as reflux material. The reflux solution was fed to the column at a rate of 125 pounds per hour. Undistilled material was withdrawn continuously from the bottom of the column. The undistilled material composed largely of ethylvinylbenzene, divinylbenzene and high boiling organic solvent contained 42.25 per cent by weight of ethylvinylbenzene, 39.2 per cent divinylbenzene, 18.25 per cent polyisopropylbenzenes and 0.25 per cent polymer. The distillation was carried out in continuous manner for a period of 21 days. The composition of the undistilled material being withdrawn from the bottom of the column near the end of this period was substantially the same as that just stated. Thereafter the distillation was stopped and the column inspected. No polymer was found in the column.

Other modes of applying the principle of the invention may be employed instead of those explained, change being made as regards the method or steps herein disclosed, provided the step or steps stated in any of the following claims or the equivalent of such stated steps be employed.

We claim:

1. In a method of recovering a mixture of ethylvinylbenzene and divinylbenzene from a more complex mixture obtained by pyrolysis of diethylbenzene, the steps which consist in first distilling the pyrolysis mixture at atmospheric pressure with steam to separate vapors of water and lower boiling components of the mixture from the liquid, such distillation being carried out in a column through which an inert organic liquid having a boiling point at least 10° C. higher than the boiling point of divinylbenzene flows countercurrent to the vapors in amount of at least 5 per cent by weight of the liquid feed to the column, while feeding a polymerization inhibitor into contact with the distilling mixture, then distilling in similar manner the residue from the first distillation to remove vapors of water, ethylvinylbenzene and divinylbenzene from the remaining liquid, and separating the aqueous and organic layers from the respective distillates.

2. In a method of recovering a mixture of ethylvinylbenzene and divinylbenzene from a more complex mixture obtained by pyrolysis of diethylbenzene, the steps which consist in first distilling the pyrolysis mixture at atmospheric pressure with steam to separate vapors of water, lower boiling components of the mixture and sufficient of the ethylvinylbenzene from the liquid so as to leave a residue containing approximately 60 parts by weight of ethylvinylbenzene and 40 parts of divinylbenzene, such distillation being carried out in a column through which an inert organic liquid having a boiling point at least 10° C. higher than divinylbenzene flows countercurrent to the vapors in amount of at least 5 per cent by weight of the liquid feed to the column, while feeding a polymerization inhibitor into contact with the distilling mixture, then distilling in similar manner the residue from the first distillation to remove vapors of water, ethylvinylbenzene and divinylbenzene from the remaining liquid and separating the aqueous and organic layers from the respective distillates.

3. In a method of recovering a mixture of ethylvinylbenzene and divinylbenzene from a more complex mixture obtained by pyrolysis of diethylbenzene, the steps which consist in first distilling the pyrolysis mixture at atmospheric pressure with steam to separate vapors of water and lower boiling components of the mixture from the liquid, such distillation being carried out in a column through which a mixture of polyisopropyl benzenes having a boiling point at least 10° C. higher than the boiling point of divinylbenzene flows countercurrent to the vapors in amount of from 5 to 25 per cent by weight of the liquid feed to the column, while feeding 2,4-dichloro-6-nitrophenol as polymerization inhibitor into contact with the distilling mixture in amounts of from 0.1 to 5 per cent by weight of the feed, then distilling in similar manner the residue from the first distillation to remove vapors of water, ethylvinylbenzene and divinylbenzene from the remaining liquid, and separating the aqueous and organic layers from the respective distillates.

4. In a process for purifying ethylvinylbenzene by distillation of a mixture containing the same together with higher boiling ingredients, the step which consists in distilling the mixture at atmospheric pressure with steam to separate vapors of water and ethylvinylbenzene from the liquid, such distillation being carried out by feeding the mixture into the mid-section of a column through which an inert organic liquid having a boiling point at least 10° C. higher than divinylbenzene flows countercurrent to the vapors in amount of at least 5 per cent by weight of the feed to the column, while feeding a polymerization inhibitor into contact with the distilling mixture, withdrawing residue from the bottom of the column, and separating the aqueous and organic layers of the distillate.

5. In a method of recovering a mixture of ethylvinylbenzene and divinylbenzene from a more complex mixture obtained by pyrolysis of diethylbenzene, the steps which consist in first distilling the pyrolysis mixture at atmospheric pressure with steam to separate vapors of water and lower boiling components of the mixture from the liquid, such distillation being carried out in continuous manner by feeding the pyrolysis mixture into the mid-section of a column through which an inert organic liquid having a boiling point at least 10° C. higher than the boiling point of divinylbenzene flows countercurrent to the vapors in amount of at least 5 per cent by weight of the feed to the column, while feeding a polymerization inhibitor into contact with the distilling mixture, withdrawing liquid residue from the column and feeding the same into the mid-section of a second column, then distilling in similar manner the residue from the first distillation to remove vapors of water, ethylvinylbenzene and divinylbenzene from the remaining liquid, separating the aqueous and organic layers from the respective distillates, and withdrawing liquid residue from the second column.

KENNETH E. COULTER.
HERBERT G. HORNBACHER.

REFERENCES CITED

The following references are of record in the file of this patent:

UNITED STATES PATENTS

| Number | Name | Date |
|---|---|---|
| 2,171,795 | Kautter | Sept. 17, 1939 |
| 2,240,764 | Dreisbach et al. | May 6, 1941 |
| 2,386,365 | Staudinger et al. | Oct. 9, 1945 |
| 2,407,861 | Wolk | Sept. 17, 1946 |
| 2,411,346 | Teter et al. | Nov. 19, 1946 |
| 2,417,886 | Redcay | Mar. 25, 1947 |